US007047563B1

(12) United States Patent
Weber et al.

(10) Patent No.: US 7,047,563 B1
(45) Date of Patent: May 16, 2006

(54) COMMAND AUTHORIZATION VIA RADIUS

(75) Inventors: Gregory Weber, Knoxville, TN (US); Laurence Grant, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

(21) Appl. No.: 09/733,617

(22) Filed: Dec. 7, 2000

(51) Int. Cl.
G06F 11/30 (2006.01)
G06F 12/14 (2006.01)
H04L 9/00 (2006.01)
H04L 9/32 (2006.01)

(52) U.S. Cl. ....................................................... 726/17
(58) Field of Classification Search ................ 713/201, 713/200; 709/225, 227, 229; 704/228; 370/230; 455/418; 716/17; 726/12
See application file for complete search history.

(56) References Cited

U.S. PATENT DOCUMENTS

| | | | |
|---|---|---|---|
| 5,241,594 A | 8/1993 | Kung ............................. 380/4 |
| 5,555,376 A * | 9/1996 | Theimer et al. ............ 709/229 |
| 5,655,077 A | 8/1997 | Jones et al. ............. 395/187.01 |
| 5,671,354 A | 9/1997 | Ito et al. ................. 395/187.01 |
| 5,684,950 A | 11/1997 | Dare et al. .............. 395/187.01 |
| 5,708,780 A | 1/1998 | Levergood et al. ..... 395/200.12 |
| 5,715,394 A | 2/1998 | Jabs ........................ 395/200.11 |
| 5,812,529 A | 9/1998 | Czarnik et al. .............. 370/245 |
| 5,815,665 A | 9/1998 | Teper et al. ............ 395/200.59 |
| 5,835,727 A | 11/1998 | Wong et al. ........... 395/200.68 |
| 5,845,070 A | 12/1998 | Ikudome ................. 395/187.01 |
| 5,881,225 A * | 3/1999 | Worth .......................... 726/17 |
| 5,897,635 A * | 4/1999 | Torres et al. ................. 707/10 |
| 5,898,780 A | 4/1999 | Liu et al. ....................... 380/3 |
| 5,933,625 A | 8/1999 | Sugiyama ................... 395/557 |
| 5,944,824 A * | 8/1999 | He ............................... 713/201 |
| 5,968,116 A | 10/1999 | Day, II et al. ............... 709/202 |
| 5,974,453 A | 10/1999 | Andersen et al. ........... 709/220 |
| 5,987,232 A | 11/1999 | Tabuki ................... 395/187.01 |
| 5,991,810 A | 11/1999 | Shapiro et al. .............. 709/229 |

(Continued)

FOREIGN PATENT DOCUMENTS

WO    WO 99/53408    10/1999

OTHER PUBLICATIONS

Bellovin, Steven M., "Problem Areas for the IP Security Protocols", Jul. 22-25, 1996, Proceedings of the Sixth Usenix UNIX Security Symposium, San Jose, CA.

(Continued)

*Primary Examiner*—Ayza Sheikh
*Assistant Examiner*—Arezoo Sherkat
(74) *Attorney, Agent, or Firm*—Thelen Reid & Priest; Marc S. Hanish

(57) ABSTRACT

Command authorization may be accomplished using the RADIUS protocol by providing a user profile on the server for each user. This user profile may be transferred to a network device, such as a NAS, when the user initiates a NAS session. It may be stored in a local cache and accessed each time the user attempts to execute a command. The user profile may contain a command set defined by regular expressions which can then be used to determine whether or not the command should be authorized. The command may then be authorized or rejected based on the results of this determination. After the session is completed, the user profile may be purged from the cache. The present invention allows for a dramatic savings in the traffic associated with command authorization and allows command authorization to be accomplished using the RADIUS protocol, which increases flexibility and NAS security.

18 Claims, 2 Drawing Sheets

U.S. PATENT DOCUMENTS

| | | | | |
|---|---|---|---|---|
| 5,991,828 | A | 11/1999 | Horie et al. | 710/8 |
| 6,006,334 | A | 12/1999 | Nguyen et al. | 713/202 |
| 6,009,103 | A | 12/1999 | Woundy | 370/401 |
| 6,011,910 | A | 1/2000 | Chau et al. | 395/200.59 |
| 6,021,429 | A | 2/2000 | Danknick | 709/208 |
| 6,021,496 | A | 2/2000 | Dutcher et al. | 713/202 |
| 6,026,441 | A | 2/2000 | Ronen | 709/227 |
| 6,044,155 | A | 3/2000 | Thomlinson et al. | 380/49 |
| 6,047,376 | A | 4/2000 | Hosoe | 713/201 |
| 6,061,650 | A * | 5/2000 | Malkin et al. | 704/228 |
| 6,065,980 | A | 5/2000 | Leung et al. | 439/92 |
| 6,081,419 | A | 6/2000 | Pham | 361/617 |
| 6,091,951 | A | 7/2000 | Sturniolo et al. | 455/432 |
| 6,092,196 | A * | 7/2000 | Reiche | 713/200 |
| 6,119,160 | A | 9/2000 | Zhang et al. | 709/224 |
| 6,141,687 | A * | 10/2000 | Blair | 709/225 |
| 6,182,142 | B1 * | 1/2001 | Win et al. | 709/229 |
| 6,301,618 | B1 * | 10/2001 | Sitaraman et al. | 709/227 |
| 6,324,648 | B1 * | 11/2001 | Grantges, Jr. | 726/12 |
| 6,463,474 | B1 * | 10/2002 | Fuh et al. | 709/225 |
| 6,466,977 | B1 * | 10/2002 | Sitaraman et al. | 709/225 |
| 6,587,433 | B1 * | 7/2003 | Borella et al. | 370/230 |
| 6,741,853 | B1 * | 5/2004 | Jiang et al. | 455/418 |

OTHER PUBLICATIONS

Cisco 6400 Access Concentrators, printed from http://www.cisco.com/warp.public/cc/pd/as6400/index.shtml on Sep. 27, 2000.

Cisco 6400 Universal Access Concentrator, Data Sheet, printed from http://www.cisco.com/warp.public.cc.pd.as.6400.prodlit/6400_ds.htm on Sep. 27, 20000.

Cisco 6400 Universal Access Concentrator, Product Bulletin—No. 1120, printed from http://www.cisco.com/warp.public.cc.pd.as.6400.prodlit/1120_pp.htm on Oct. 4, 2000.

Cisco Asymmetric Digital Subscriber Line Services Architecture, White Paper, printed from http://www.cisco.com.warp.public/cc/so/neso/dsso/global/ads1_wp.htm on Sep. 27, 2000.

"Cisco User Control Point", pp. 1-4, printed from http://www.cisco.com/warp/public/728/ucp ds.htm on Sep. 10, 1998.

"IBM Introduces New Subscriber Management System for Internet Service Provider", Dec. 2, 1998, IBM Corporation, printed from http://www.cisco.com/univered/cc/td/doc/products/software/ios113ed/113t/113t3/ispec.

"IPsec Network Security", pp. 1-69, printed from http://www.cisco.com/univercd/cc/td/doc/products/software/ios113ed/113t/113t3/ipsec.

Layer 2 Tunnel Protocol, Release 12.0(iI)T and 11.3(5)AA.

"L2TP", 1998, Mecklemedia Corporation, printed from http://www/webopedia.internet.com/TERM/L/L2TP/html.

"MultiVPN from Ascend Communications: Breaking Down the Barriers to VPNs", Ascend Communications, Inc., White Paper, 1998.

Patel, B., et al., "Securing L2TP using IPSEC", May 1998, PPPEXT Working Group, pp. 1-10, printed from http://www.masinter.net/~12tp/ ftp/draft-ietf-pppext-12tp-security-02.txt.on Sep. 21, 1998.

"Remote Access Network Security", Ascend Communications, Inc., printed from http://www.ascend.com/1103.html, on Jul. 24, 1998, pp. 1-8.

Rigney, et al., "Remote Authentication Dial In User Service (RADIUS) ", Network Working Group, RFC 2138, Apr. 1997, pp.1-57.

Rosen, et al., "Multiprotocol Label Switching Architecture", Apr. 1999, Network Working Group, Internet-Draft, pp. 1-62.

Tunneling, 1998, Meckermedia Corporation, printed from http://webopedia.internet.com/TERM/t/tunneling.html.

Carrel, D. et al., The TACACS+Protocol, Version 1.78, Cisco Systems, Inc., printed from ftp://ftp-eng.cisco.com/edweber/tac-rfc.1.78.txt on Oct. 23, 2000.

* cited by examiner

```
200           202
  \           /
  oper1  Password = "abc^123"
           Service-Type = Login
      204
         \ Cisco: AVPair = "shell:cmd-expr=show .*",
      206
         \ Cisco: AVPair = "shell:cmd-expr=telnet 10\.14\.0\.[0-9]+",
      208
         \ Cisco: AVPair = "shell:cmd-expr=ping .*"
```

COMMAND AUTHORIZATION VIA RADIUS

BACKGROUND OF THE INVENTION

1. Field of the Invention

The present invention relates to the field of network communications. More specifically, the present invention relates to authorizing individual commands in the Remote Authentication Dial In User Server (RADIUS) protocol.

2. The Background

The Remote Authentication Dial In User Server (RADIUS) protocol is an access control protocol used to provide Authentication, Authorization, and Accounting (AAA) services for various network devices, but especially for Network Access Servers (NASes). Most service providers utilize RADIUS, and it is also used commonly in the Enterprise market.

In RADIUS, when a client initiates a call to a NAS, username and password information is collected. This username and password information is then forwarded to a central AAA server. A single transaction with the server is used to both authenticate and authorize the user. A session may then be initiated. A session is an active connection between two devices. During the rest of the session, the user then may initiate commands, and accounting records may be sent to the AAA server indicating the beginning and end of the client session.

A need exists, however, for individual commands to be authorized by an AAA server. This would allow routers or NASes that are accessed by many different administrators performing different functions to operate more efficiently and securely. The RADIUS protocol does not currently support this type of command authorization. The Terminal Access Controller Access Control System (TACACS+) is an access control protocol that offers command authorization. TACACS+ is based on the Transmission Control Protocol (TCP) and provides for a transmission from the network device receiving the command to the AAA server to request authorization to execute the command. The AAA server then may access a stored profile to determine if the user has authorization to perform the command. Then the AAA server may send a transmission back to the network device via TACACS+ indicating the results of the determination regarding authorization.

This solution, however, has several drawbacks. First, each individual command must be authorized. This involves sending a request to the AAA server and waiting to receive a response each time a network device receives a command from a user, causing additional delays in authorizing commands. Also since TACACS+ is based on TCP, a total of 8 packets must be transmitted back and forth between the network device and the AAA server each time a command is authorized, causing additional network traffic.

Additionally, RADIUS is much more commonly used than TACACS+. Accordingly, a need exists for a way to implement command authorization in the RADIUS protocol.

SUMMARY OF THE INVENTION

Command authorization may be accomplished using the RADIUS protocol by providing a user profile on the server for each user. This user profile may be transferred to a network device, such as a NAS, when the user initiates a RADIUS session. It may be stored in a local cache and accessed each time the user attempts to execute a command. The user profile may contain a command set defined by regular expressions, which are used in pattern matching which can then be used to determine whether or not the command should be authorized. The command may then be authorized or rejected based on the results of this determination. After the session is completed, the user profile may be purged from the cache. The present invention allows for a dramatic savings in the traffic and execution time associated with command authorization and allows command authorization to be accomplished using the RADIUS protocol, which increases flexibility.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control and/or using a program storage device, and that modification of the general purpose computer to implement the components, process steps, and/or data structures described herein would not require undue invention.

In accordance with a specific embodiment of the present invention, the components, process steps, and/or data structures are implemented using software running on a network access server or other network device, such as a Cisco™ Gigabit Switch Router or a Cisco™ Universal Access Server. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

The present invention provides for command authorization in the RADIUS protocol by storing a user profile in a cache or memory at a network device, such as a NAS. This user profile is transmitted from the AAA server to the NAS when a RADIUS session is begun. Thereafter, any command issued by the user is first checked against a record in the user profile. The record contains information as to which commands the user is authorized to execute. The NAS may then determine whether to authorize the command based on the information in the record. When the session is completed, the user profile may be purged from the cache. This solution allows for command authorization via the RADIUS protocol without having to send packets to the AAA server each time a command is issued. Additionally, since RADIUS does not use TCP, the transmission between the AAA server and the NAS at the beginning of the session uses fewer packets than even a single command authorization in TACACS+.

Figures 1, 2:
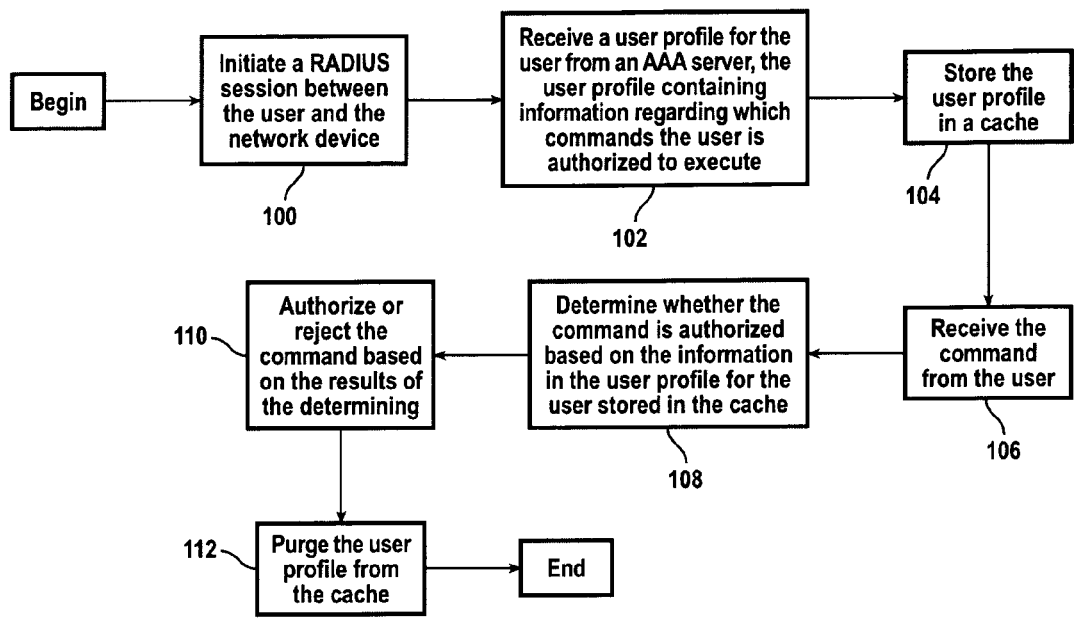
FIG. 1 is a flow diagram illustrating a method for authorizing a command from a user in a network device in accordance with a specific embodiment of the present invention.
FIG. 2 is a diagram illustrating an example of a user profile in accordance with a specific embodiment of the present invention.

FIG. 1 is a flow diagram illustrating a method for authorizing a command from a user in a network device in accordance with a specific embodiment of the present invention. At 100, a RADIUS session is initiated between the user and the network device. In a specific embodiment of the present invention, the network device is a NAS. At 102, a user profile for the user is received from an AAA server, the user profile containing information regarding which commands the user is authorized to execute. The user profile may take many different forms. In a specific embodiment of the present invention, the user profile contains a command set described by regular expressions. FIG. 2 is a diagram illustrating an example of a user profile in accordance with a specific embodiment of the present invention. A user name 200 may identify the user (here, oper1). A password 202 may indicate the user's password, which may be checked when establishing the session. A command set that the user is authorized to issue may be defined by one or more Basic or Extended Regular Expressions as defined by IEEE P1003.2. A series of attribute value pairs (AVPairs) 204, 206, 208 define the regular expressions for the command set. A regular expression is any simple expression that can be handled by a finite automaton. Generally, regular expressions may resemble broad set definitions (e.g., "run .*" indicating that all commands beginning with the word "run" are part of the set) or definitions using boolean operators on sets (e.g., set a+set b). In RADIUS, the AVPairs may be used to hold the expressions defining an authorized command set. AV Pair 204 indicates that the user may execute any show command, while AVPair 208 indicates that the user may execute any ping command. AVPair 206 indicates that the user may execute a telnet command, but only may telnet to IP addresses beginning with "10.14.0."

Referring back to FIG. 1, at 104, the user profile may be stored in a cache. This cache may be local to the NAS or network device. This will allow access to the user profile without having to reestablish contact with the AAA server. At 106, the command is received from the user. Since the network device may be a NAS, or may be any other network device, the type and format of the available commands may include any number of choices. At 108, it is determined whether the command is authorized based on the information in the user profile for the user stored in the cache. This may include comparing the command to a command set contained in the user profile. The command set may be a list of authorized commands, or alternatively, may be described by regular expressions. At 110, the command may then be authorized or rejected based on the results of the determining. If the NAS is configured to authorize individual commands, then this cached command set will be consulted whenever a command execution attempt is made. If the user has abbreviated the command in any way, it is first expanded to its full form, then regular expression matching is performed against the cached command set definition. The command set may be cached for the remainder of the session, thus at 112, when the RADIUS session is terminated, the user profile may then be purged from the cache.

Figure 3:
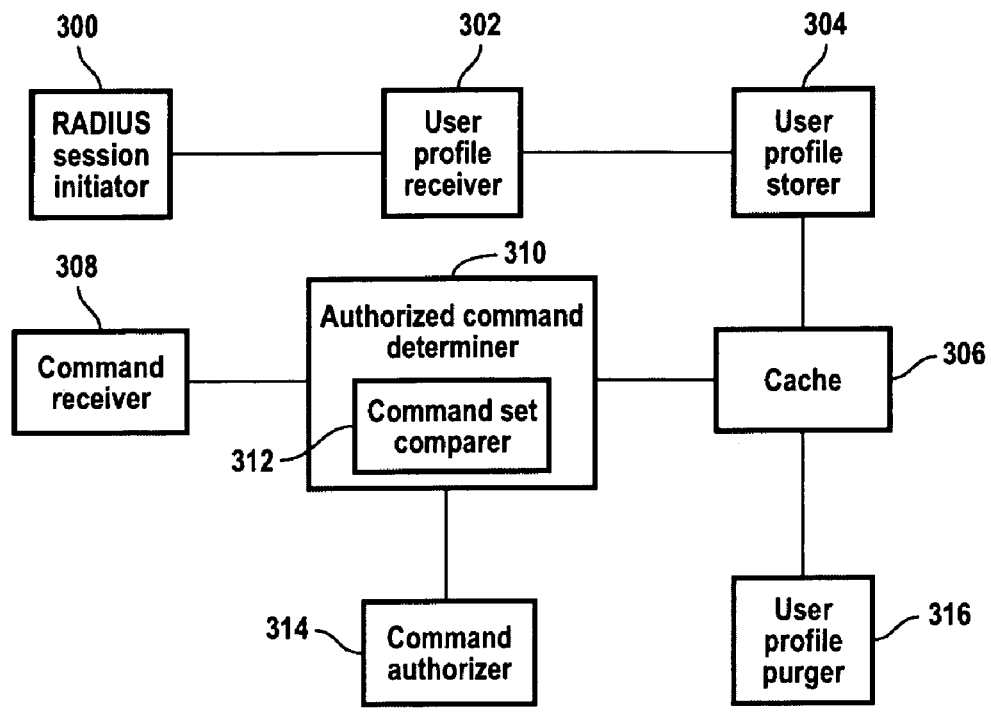
FIG. 3 is a block diagram illustrating an apparatus for authorizing a command from a user in a network device in accordance with a specific embodiment of the present invention.

FIG. 3 is a block diagram illustrating an apparatus for authorizing a command from a user in a network device in accordance with a specific embodiment of the present invention. A RADIUS session initiator 300 initiates a RADIUS session between the user and the network device. In a specific embodiment of the present invention, the network device is a NAS. A user profile receiver 302 coupled to the RADIUS session initiator 300 receives a user profile for the user from an AAA server, the user profile containing information regarding which commands the user is authorized to execute. The user profile may take many different forms. In a specific embodiment of the present invention, the user profile contains a command set described by regular expressions.

A user profile storer 304 coupled to the user profile receiver 302 and to a cache 306 stores the user profile for the user in a cache. This cache may be local to the NAS or network device. This will allow access to the user profile without having to reestablish contact with the AAA server. A command receiver 308 receives the command from the user. Since the network device may be a NAS, or may be any other network device, the type and format of the available commands may include any number of choices. An authorized command determiner 310 coupled to the command receiver 308 and to the cache 306 determines whether the command is authorized based on the information in the user profile for the user stored in the cache. This may include comparing the command to a command set contained in the user profile using a command set comparer 312. The command set may be a list of authorized commands, or alternatively, may be described by regular expressions. A command authorizer 314 coupled to the authorized command determiner 310 may then be authorized or rejected based on the results of the determining. A user profile purger 316 coupled to the cache 306 may then purge the user profile when the RADIUS session is terminated.

Figure 4:
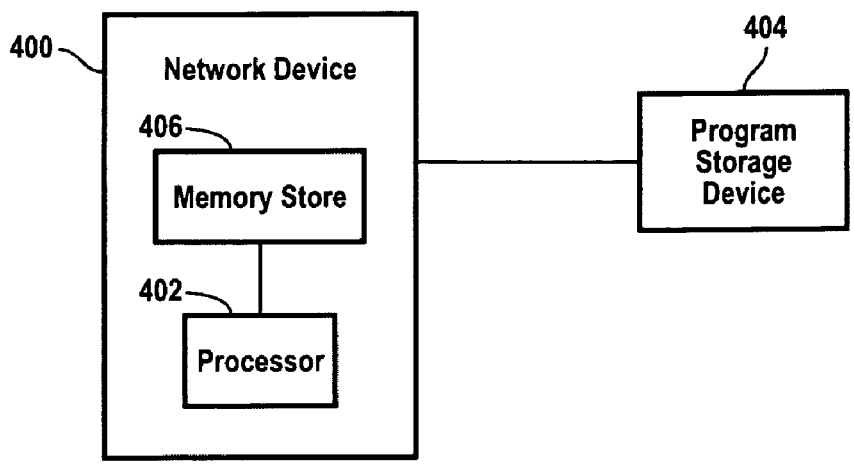
FIG. 4 is a block diagram illustrating a network device in accordance with a specific embodiment of the present invention.

FIG. 4 is a block diagram illustrating a network device in accordance with a specific embodiment of the present invention. Network Device 400 contains a processor 402, for executing instructions. A program storage device 404 may hold software containing instructions for executing the present invention. A memory store 406, such as random-access memory (RAM) may be utilized to temporarily store the instructions from the program storage device.

By utilizing the RADIUS protocol to perform command authorization, the present invention allows individual commands from users to be independently authorized or rejected while minimizing the traffic load on the system. This invention may also have specific usefulness in the burgeoning field of enterprise networking, where there are currently many users of TACACS+who might be better off utilizing a RADIUS-based system.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for authorizing a command from a user received at a network device separate and distinct from an Authentication, Authorization, and Accounting (AAA) server, the method including:
   establishing an access control protocol session with the user;
   receiving a user profile for the user at the network device from a AAA server, the user profile containing information regarding which commands the user is authorized to execute, the information including a command set described by regular expressions;

storing the user profile in a memory accessible by the network device;

receiving the command from the user;

comparing the command to said command set contained in said user profile; and authorizing the command if the command is contained in said command set.

2. The method of claim 1, wherein the network device is a Network Access Server (NAS).

3. The method of claim 1, further including purging said user profile from said memory when said access control protocol session is terminated.

4. The method of claim 1, wherein said access control protocol session is a RADIUS session.

5. The method of claim 1, wherein said command set is a list of previously authorized commands.

6. The method of claim 1, wherein said command set is described by regular expressions.

7. An apparatus for authorizing a command from a user received at a network device separate and distinct from an Authentication, Authorization, and Accounting (AAA) server, the apparatus including:

a RADIUS session initiator;

a user profile receiver coupled to said RADIUS session initiator and coupled to a AAA server;

a memory containing a user profile having a command set;

a user profile storer coupled to said user profile receiver and said memory;

a command receiver;

a command set comparer coupled to said memory and to said command receiver; and a command authorizer coupled to said command set comparer.

8. The apparatus of claim 7, wherein the network device is a Network Access Server (NAS).

9. The apparatus of claim 7, further including a user profile purger coupled to said memory.

10. The apparatus of claim 7, wherein said command set is a list of previously authorized commands.

11. The apparatus of claim 7, wherein said command set is described by regular expressions.

12. An apparatus for authorizing a command from a user received at a network device separate and distinct from an Authentication, Authorization, and Accounting (AAA) server, the method including:

means for establishing an access control protocol session with the user;

means for receiving a user profile for the user at the network device from a AAA server, the user profile containing information regarding which commands the user is authorized to execute, the information including a command set described by regular expressions;

means for storing the user profile in a memory accessible by the network device;

means for receiving the command from the user;

means for comparing the command to said command set contained in said user profile; and means for authorizing the command if the command is contained in said command set.

13. The apparatus of claim 12, wherein the network device is a Network Access Server (NAS).

14. The apparatus of claim 12, further including means for purging said user profile from said memory when said access control protocol session is terminated.

15. The apparatus of claim 12, wherein said access control protocol session is a RADIUS session.

16. The apparatus of claim 12, wherein said command set is a list of authorized commands.

17. The apparatus of claim 12, wherein said command set is described by regular expressions.

18. A program storage device readable by a machine, tangibly embodying a program of instructions executable by the machine to perform a method for authorizing a command from a user received at a network device separate and distinct from an Authentication, Authorization, and Accounting (AAA) server, the method including:

establishing an access control protocol session with the user;

receiving a user profile for the user at the network device from a AAA server, the user profile containing information regarding which commands the user is authorized to execute, the information including a command set described by regular expressions;

storing the user profile in a memory accessible by the network device;

receiving the command from the user;

comparing the command to said command set contained in said user profile; and authorizing the command if the command is contained in said command set.

* * * * *